United States Patent
Chapman

[15] 3,650,124
[45] Mar. 21, 1972

[54] ROTATABLE COUPLINGS

[72] Inventor: Charles Wallace Chapman, Winchelsea, England

[73] Assignee: Twiflex Couplings Limited, Middlesex, England

[22] Filed: Nov. 14, 1969

[21] Appl. No.: 876,679

[30] Foreign Application Priority Data

Jan. 3, 1969 Great Britain..........................633/69

[52] U.S. Cl......................................................64/19, 64/27
[51] Int. Cl.................................................F16d 3/14
[58] Field of Search.................................64/27, 19, 12

[56] References Cited

UNITED STATES PATENTS

| | | | |
|---|---|---|---|
| 2,236,139 | 3/1941 | Hutchison | 64/19 |
| 2,580,781 | 1/1952 | Hoffer | 64/19 |
| 2,910,844 | 11/1959 | Chapman | 64/19 |
| 3,528,264 | 9/1970 | Chapman | 64/19 |

*Primary Examiner*—Mark M. Newman
*Assistant Examiner*—Randall Heald
*Attorney*—Buell, Blenko and Ziesenheim

[57] ABSTRACT

A rotatable coupling comprises rotatable driving and driven members between which is pivotally connected one or more linkages each comprising tangential and radial links connected together by a pivotal connection. The distance between the pivotal connections at the ends of the tangential link is not less than 0.35 of the radial distance between the axis of rotation of the coupling and the pivotal connection between the tangential link and the driving or driven member. The linkage is so arranged as to be deformed by relative rotation between the driving and driven members in at least one direction. The deformation is opposed by a resilient bush at the pivot between the two links and at least the major part of the torque transmitted by the coupling, in its normal operating speed range, is transmitted by tension in the links caused by straining the resilient bush.

4 Claims, 7 Drawing Figures

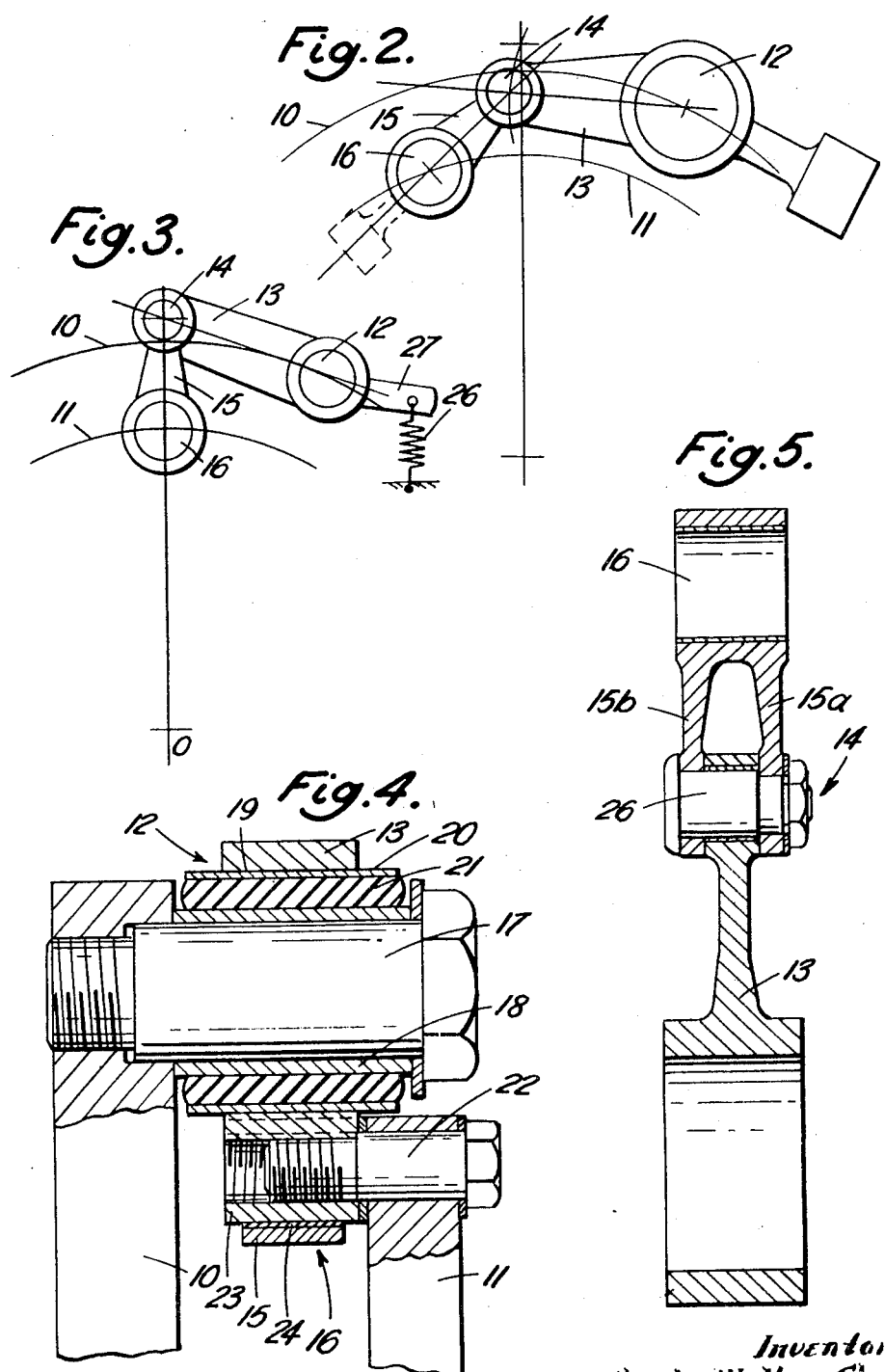

ROTATABLE COUPLINGS

The invention relates to rotatable couplings of the kind comprising rotatable driving and driven members between which is pivotally connected at least one linkage comprising tangential and radial links (as hereinafter defined) connected together by a pivotal connection, the linkage being such that it is deformed by relative rotation between the driving and driven members in at least one direction such deformation being opposed by resilient means and at least the major part of the torque transmitted by the coupling, in its normal operating speed range, is transmitted by tension in the links caused by straining said resilient means.

By a "radial link" is meant a link in which the line joining the pivotal connections at the ends of the link is inclined at an angle of less than 45° to that radius of the coupling which passes through the pivotal connection between the link and the driving or driven member (when no torque is being transmitted by the coupling). Similarly, by a "tangential link" is meant a link in which the line joining the pivotal connections at its ends is inclined at an angle less than 45° to a line passing tangentially through the pivotal connection between the link and the driven or driving member (again, when no torque is being transmitted by the coupling).

According to the invention, a rotatable coupling of the kind referred to is characterized in that the distance between the pivotal connections at the ends of the tangential link is not less than 0.35 of the radial distance between the axis of rotation of the coupling and the pivotal connection between the tangential link and the driving or driven member.

Preferably the distance between the pivotal connections at the ends of the radial link is not less than 0.285 of the radial distance between the axis of rotation of the coupling and the pivotal connection between the tangential link and the driving or driven member.

The coupling may be provided with stops on the driving member and/or driven member, which stops are adapted positively to limit deformation of the linkage in either sense to an extent which the resilient means can stand.

Preferably the line joining the pivotal connections at the ends of the radial link is on a radial line through the center of rotation of the coupling when the coupling is transmitting no torque. Preferably, also, the line joining the pivotal connections at the ends of the tangential link is inclined at an angle of less than 20° to the line passing tangentially through the pivotal connection between the link and the driven or driving member.

In the case where there are provided a plurality of linkages spaced apart around the axis of rotation of the coupling, and where each pivotal connection comprises a pivot pin projection in the axial direction from the driving or driven member, there may be provided a support element engaging and connecting the projecting ends of the pivot pins to bear radial and/or tangential loads thereon. For example the support element may comprise a ring formed with circumferentially spaced holes which receive and retain the projecting ends of the pivot pins.

In any of the above arrangements each linkage may comprise a plurality of tangential links connected in parallel and pivotally connected to a plurality of radial links which are also connected in parallel.

There may be associated with one or more of the links a friction element which is fixed in relation to the member on which the link is pivotally mounted, which friction element is engaged by a part of the link so as frictionally to restrain pivotal movement thereof.

The following is a more detailed description of various embodiments of the invention reference being made to the accompanying diagrammatic drawings in which:

FIGS. 2 and 3 are similar views showing alternative forms of linkage;

FIG. 4 is a false section through the pivotal connections between a linkage of the kind shown in FIG. 1 and the driving and driven members of the coupling;

FIG. 5 is a section through a fully extended linkage showing the construction of the pivotal connection between the two links;

Figure 1:
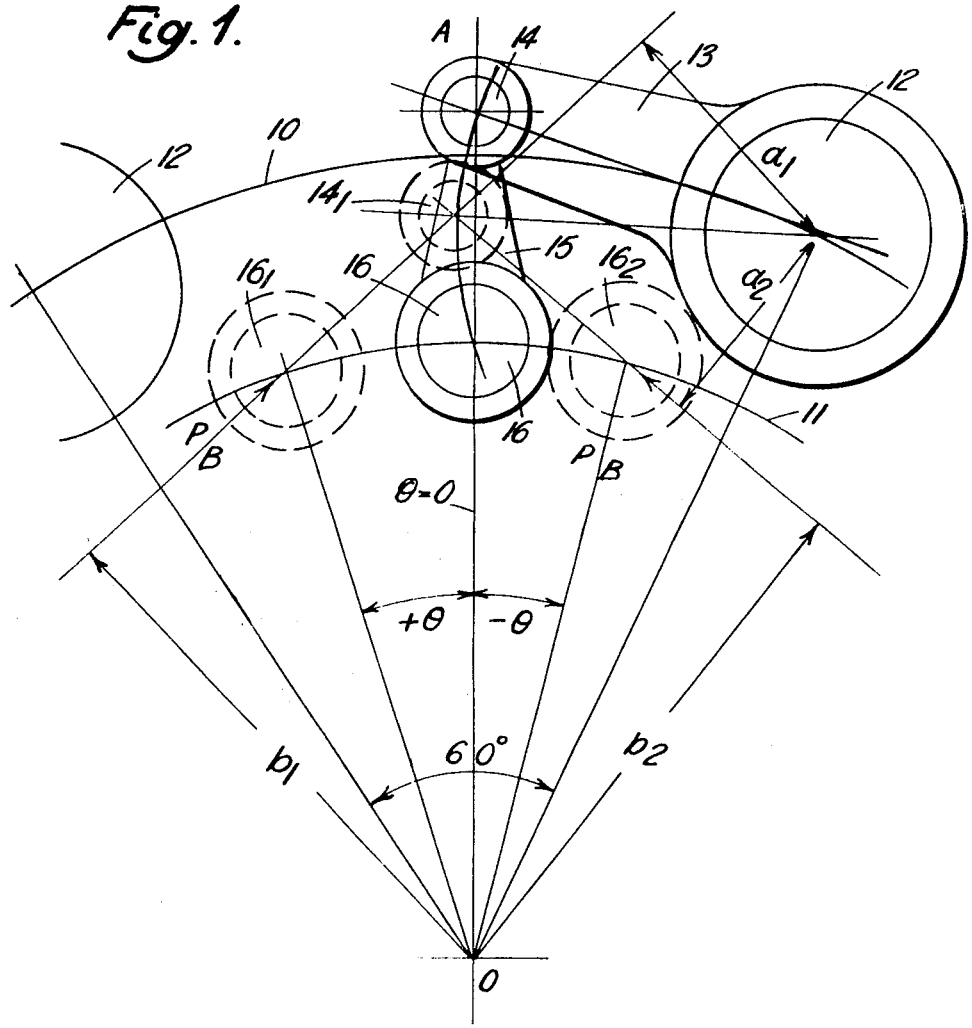
FIG. 1 is a diagrammatic view of one linkage of a rotatable coupling looking in the direction of the axis of rotation of the coupling.

Referring to FIG. 1: the coupling comprises two rotatable members indicated diagrammatically at 10 and 11 respectively. Either member may be the driving or the driven member and the radius of the member 11 is preferably smaller than that of the member 10. A tangential link 13 (as defined above) is pivotally connected at one end to the member 10 by a pivot 12 and is connected at its other end, by pivot 14, to one end of a radial link 15 (as before defined above). The other end of the radial link 15 is connected by a pivot 16 to the member 11.

As best seen in FIG. 4, the pivot 12 comprises a pivot pin 17 which projects in the axial direction from the member 10 and is encircled by a fixed sleeve 18. The link 13 is formed with a bore 19 in which is secured a further sleeve 20. A bush 21 of rubber or resilient plastics material is bonded between the sleeves 18 and 20 so that pivotal movement of the link 13 of the pin 17 is opposed by the distortion of the resilient bush 21.

The pivot 16 comprises a pivot pin 22 which is mounted in the member 11 and is encircled by a sleeve 23. A bore 24 in the end of the link 15 encircles the sleeve 23 to provide a plain pivot bearing.

As best seen in FIG. 5, the end of the link 13 remote from the pivot 12 fits between two limbs 15a and 15b of the link 15 and a pivot pin 26 passes through registering bores in the links 13 and 15 to provide the pivot 14.

In the arrangement shown in FIG. 1 the line joining the pivots 12 and 14 at the ends of the link 13 is substantially tangential to the line joining the pivot 12 to the axis of rotation 0 of he coupling (when the coupling is transmitting no torque.) Also, when the coupling is transmitting no torque, the line joining the pivots 14 and 16 at the ends of the link 15 is substantially radial. The length of the link 13 (i.e., the distance between the pivot axes of the pivots 12 and 14) is approximately 0.465 R (where R is the radial distance of the pivot axis of the pivot 12 from the axis of rotation 0 of the coupling). The length of the link 15 (i.e., the distance between the pivot axes of the pivots 14 and 16) is not less than 0.285 R. These lengths are such that when the pivotal connection 14 is in the full line position of FIG. 1, and no torque is transmitted by the coupling, the resilient bush 21 is substantially free of twist.

If now the member 11 is regarded as the driving member and is rotated anticlockwise and the driven member 10 is held stationary by a resistance, the movement to the left (in FIG. 1) of the link 15 will pull the pivot 14 downwards, the pivot 14 swinging in an arc about the pivot 12. This will twist the bush 21 which will exert an upward force on the pivot 14 and put the link 15 in tension. Thus when the link 15 is in the position shown dotted and indicated at $14_1$, $16_1$, in FIG. 1, the tension in the link 15 will apply a force $P_B$ at 16 in the direction $16_1$–$14_1$, having a moment arm $b1$ about the axis of rotation 0. This gives a clockwise torque on the driving member 11 of $P_B \times b_1$ resisting the applied torque. There will be a corresponding anticlockwise torque on the driven member 10 in the same direction as the applied torque on the driving member 11. If the twisting of bush 21 requires a torque $B_T$ about its center and if the perpendicular distance of the line $14_1$–$16_1$ from the center of the pivot 12 is $a_1$, then the torque $T_B$ on the coupling from one linkage is $P_B \times b_1$, that is to say $b_T \times b_1/a_1$. This will be zero when the pivot 14 is in about the full line position shown in FIG. 1, that is to say when the bush 21 at the pivot 12 is free of twist and/or the link 15 is radial. The torque will rise to infinity when the pivots 16, 14 and 12 are in line and the distance $a_1$ is zero.

If, however, when link 15 is about radial and pivot 14 is in the full-line position of FIG. 1, the member 11 be rotated clockwise as the driving member, the other member 10 being held stationary, the link 15 will again pull the pivot 14 downwards giving the same action as before and putting link 15 in tension. There will again be a force $P_B$, this time in direction $16_2$–$14_1$, having a moment arm $b_2$ about 0. Using the same notation as before, the coupling torque ($T_B$) per linkage will be $B_T \times b_2/a_2$. This will again be zero when pivot 14 is in the full-line position and would again reach infinity if the torsional deflection were continued until links 13 and 15 again came into line. In this direction of deflection however the probability is that any suitable torsionally resilient pivot at 12 would be over-stressed before the links came into line. Before this occurred the torque $T_B$ in this direction would usually exceed the corresponding torque for safe twist of bush 21 with deflection in the first direction above. Accordingly it may be desirable to limit the torsional deflection in this second direction by allowing the boss of the link 15 at the pivot 16 to foul the boss of the link 13 at pivot 12, or otherwise provide stops to limit torsional deflection. Such "fouling" points or stops may be provided with suitable elastic buffers. Limit stops as above may if desired be provided for the first mentioned direction of torsional deflection of the coupling halves.

In the arrangement described above and in other arrangements coming within the scope of the invention, the link 13 is longer than in previously known arrangements. The greater the length of the kink 13 then the greater is the allowable radial movement of the pivot 14 and for a given length of the link 15 the greater is the allowable coupling deflection θ and the lower the torsional stiffness of the coupling.

In the arrangement shown the major part of the torque transmitted by the coupling is transmitted by tension in the links from the twisting of bush 21. The unbalanced weight of the pivot 14 is kept as small as possible to ensure that centrifugal force torques are kept to a minimum. This, coupled with the long link 13, ensures that the torque capacity rise (i.e., the torsional resistance) of the coupling with increase of coupling deflection over the useful range is as slow as possible and the coupling stiffness relative to the torque transmitted is as low as possible. Another advantage of having a long link 13 is that this ensures that the operating radius of the pivot 14 reduces appreciably with increase of coupling deflection (and so of coupling torque) thereby further reducing the torque due to centrifugal force.

Similarly, the link 15 is also preferably appreciably longer than in earlier known arrangements. The greater the length of the link 15 the greater is the allowable coupling deflection for a given twist of the bush 21 at the pivot 12, and the softer the coupling.

FIG. 3 is a modification of the arrangement of FIG. 1 in which the swing of the link 13 is resisted by a tension spring 26 connected between a lug 27 on the link 13 and the coupling member 10. The spring may be of any other convenient form such as a spiral spring.

Any one or more of the pivots 12, 14 and 16 may be torsionally resilient pivots, for example having torsionally resilient bushes of the kind described with reference to pivot 12. When the pivots 14 and 16 are of the plain type they are preferably fitted with self-lubricating bushes or "dry" type bearing bushes.

When a coupling of the type shown in FIG. 1 is rotated, centrifugal force on the unbalanced arms of the links 13 and 15 and on the bosses, bushes, and pivot pin of the pivot 14 will tend to move the pivot 14 more or less radially outwards, swinging on the link 13 about the pivot 12. This will increase the tension $P_B$ in the link 15 and hence increase the coupling torque. This additional tension in the link 15 ($P_G$) will be the centrifugal force mentioned above multiplied by its moment arm about the pivot 12 and divided by $a_1$ or $a_2$ above according to the direction of the torsional deflection of the coupling halves. $P_G$ will add a coupling torque ($T_G$) equal to $P_G \times (b_1$ or $b_2)$, the final coupling torque being $T=T_B+T_G$. $T_G$ will be zero at zero speed and will increase as the square of the rotational speed of the coupling. If the weight of links 13 and 15, apart from their bosses at 12 and 16, and of pivot 14 be kept minimal, even at maximum operating speed $T_G$ may be kept small in relation to $T_B$, so that the torque capacity of the coupling is largely independent of speed.

For certain applications it may be desirable to keep the coupling's torque capacity more closely independent of speed and in this case one or both of links 13 and 15 may be wholly or partly counterbalanced as indicated in FIG. 3.

Figure 6:
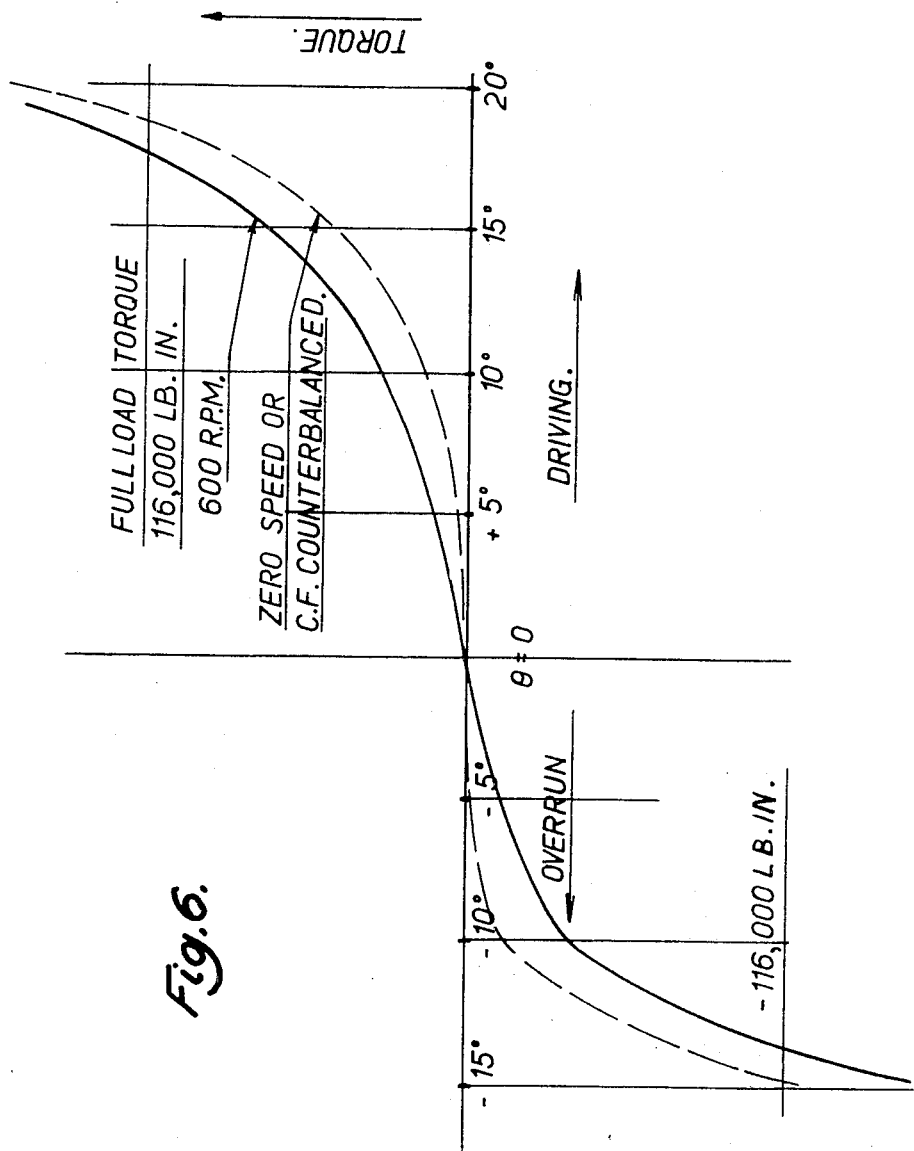
FIG. 6 is a typical torque/deflection curve for a coupling.

FIG. 6 is a typical torque deflection curve for a coupling suitable for 1000/1100 H.P. at 600 r.p.m.

Figure 7:
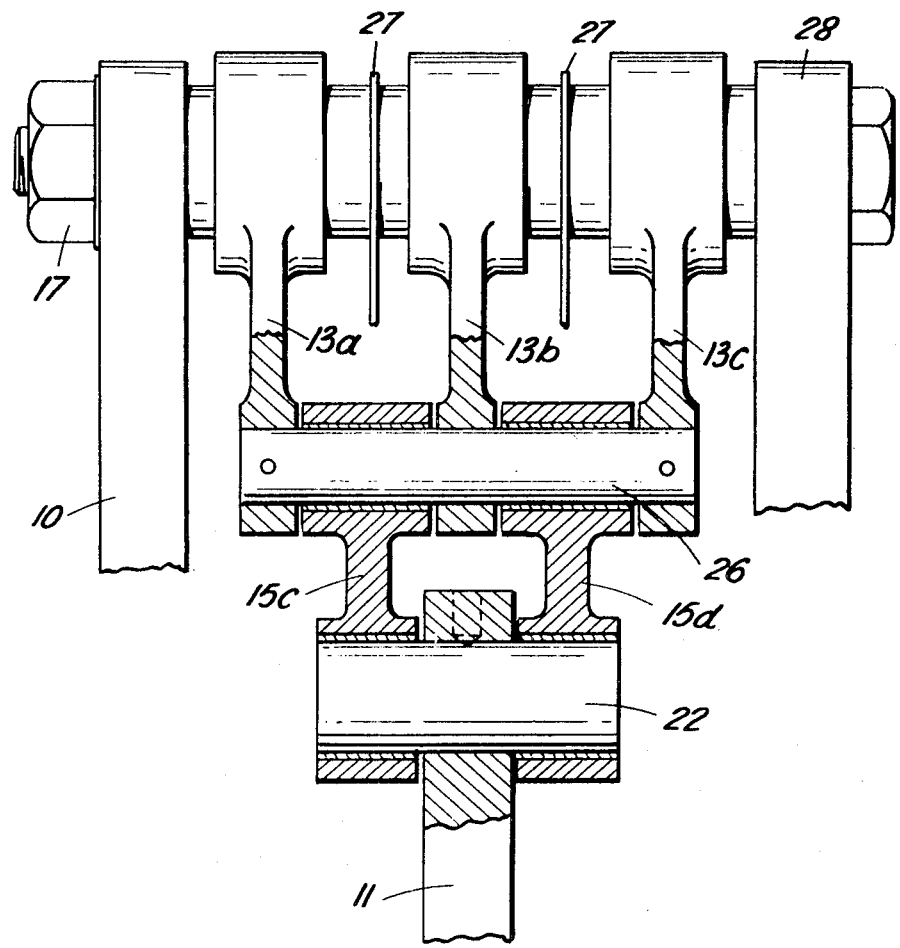
FIG. 7 is a part section, part side elevation of a linkage incorporating a plurality of links arranged in parallel.

FIG. 7 shows a modified form of linkage in which there are provided two parallel radial links 15c and 15d extending between the pivot pin 22 on the driven member 11 and the pivot pin 26. There are provided three parallel tangential links 13a, 13b and 13c extending between the pin 26 and the pin 17. Annular friction rings 27 are disposed between adjacent bosses of the links 13a, 13b and 13c to restrain pivotal movement between those links and the pin 17. To bear radial and tangential loads on the pin 17 there is provided an annular support ring 28 which is formed around its circumference with spaced holes which engage over the pins 17 of the linkages which are spaced around the axis of rotation of the coupling.

In any of the above arrangements any required number of linkages may be provided spaced round the axis of rotation of the coupling, for example six such linkages, equally spaced, may be provided.

I claim:
1. A rotatable coupling comprising:
   a. driving and driven members rotatable about a common axis
   b. a tangential link
   c. a radial link
   d. a first pivotal connection pivotally connecting the tangential link to one of said members
   e. a second pivotal connection pivotally connecting the radial link to the other of said members
   f. a third pivotal connection between the two links
   g. the distance between the first and third pivotal connections being not less than 0.35 of the radial distance between the axis of rotation of the coupling and the first pivotal connection
   h. resilient means opposing relative movement between the links due to relative rotation between the driving and driven members in at least one direction
   i. the major part of the torque of the coupling, in its normal operating speed range, being transmitted by tension in the links caused by straining said resilient means, and
   j. wherein a line joining the second and third pivotal connections is a radial line through the axis of rotation of the coupling when the coupling is transmitting no torque.

2. A rotatable coupling comprising:
   a. driving and driven members rotatable about a common axis
   b. a plurality of linkages, each comprising a tangential link and radial link, spaced apart around the axis of rotation of the coupling,
   c. a first pivotal connection pivotally connecting each tangential link to one of said members
   d. a second pivotal connection pivotally connecting each radial link to the other of said members
   e. a third pivotal connection between the two links
   f. the distance between the first and third pivotal connections being not less than 0.35 of the radial distance between the axis of rotation of the coupling and first pivotal connection
   g. resilient means opposing relative movement between the links due to relative rotation between the driving and driven members in at least one direction
   h. the major part of the torque of the coupling, in its normal operating speed range, being transmitted by tension in the links caused by straining said resilient means, and i. each pivotal connection comprising a pivot pin projecting in the axial direction, there being provided a support element engaging and connecting the projecting ends of the pivot pins to bear radial and tangential loads thereon.

3. A rotatable coupling according to claim 2 wherein the support element comprises a ring formed with circumferentially spaced holes which receive and retain the projecting ends of the pivot pins.

4. A rotatable coupling comprising
   a. driving and driven members rotatable about a common axis
   b. a plurality of tangential links connected in parallel
   c. a plurality of radial links connected in parallel
   d. a first pin on one of said members on which pins said tangential links are pivotally mounted
   e. a second pin on the other of said members on which pin said radial links are pivotally mounted
   f. a third pin between the tangential and radial links
   g. the distance between the first and third pivotal connections being not less than 0.35 of the radial distance between the axis of rotation of the coupling and the first pivotal connection
   h. resilient means opposing relative movement between the links due to relative rotation between the driving and driven members in at least one direction
   i. the major part of the torque of the coupling, in its normal operating speed range, being transmitted by tension in the links caused by straining said resilient means.

* * * * *